United States Patent [19]
Writt

[11] Patent Number: 5,174,026
[45] Date of Patent: Dec. 29, 1992

[54] NUTCRACKER WITH COMPARTMENTED RECEPTACLE

[76] Inventor: Kevin D. Writt, 1729 Wishmeyer La., Indianapolis, Ind. 46239

[21] Appl. No.: 801,643

[22] Filed: Dec. 2, 1991

[51] Int. Cl.$^5$ .................. A47J 43/26; B26B 17/02; A23N 5/00
[52] U.S. Cl. .................. 30/120.2; 30/120.3; 99/579
[58] Field of Search .............. 30/120, 120.1, 120.2, 30/120.3, 120.4, 120.5; 99/572, 579, 580, 582

[56] References Cited

U.S. PATENT DOCUMENTS

| | | | |
|---|---|---|---|
| 1,194,592 | 8/1916 | Blair | 99/579 |
| 1,834,347 | 12/1931 | Nixon | 99/579 |
| 3,713,468 | 1/1973 | Walsh | 30/120.2 |
| 4,009,651 | 3/1977 | Adams | 99/579 |
| 4,044,663 | 8/1977 | Straw | 99/577 |
| 4,128,938 | 12/1978 | Davis | 30/120 |
| 4,200,042 | 4/1980 | Scholz | 30/120.3 |
| 4,614,033 | 9/1986 | Morris | 30/120.2 |
| 4,641,430 | 2/1987 | Hahn | 30/120 |
| 4,843,715 | 7/1989 | Truax | 30/120.5 |

Primary Examiner—Douglas D. Watts
Assistant Examiner—Paul M. Heyrana, Sr.
Attorney, Agent, or Firm—Woodard, Emhardt, Naughton, Moriarty & McNett

[57] ABSTRACT

A nutcracking apparatus includes a nutcracker and a compartmented receptacle. The receptacle if formed having side walls, end walls and a floor, with a support wall dividing the receptacle into a nut compartment and a smaller shell compartment. A support platform is mounted to the support wall and includes an overhang portion into the nut compartment to provide an adequate base for absorbing the force applied for cracking nuts. A cracking pad is mounted on the support platform which includes a recess for receiving and supporting a nut to be cracked. A cracking lever arm is pivotally mounted to the support platform and includes a notch aligned with the recess for engaging a nut between the cracking pad and the lever arm. Also supported on the support platform is an end containment wall, a side containment wall and an opposite shell-directing wall for controlling shell fragments during the cracking process. The shell-directing wall is longer than the side containment wall and is disposed between the nutcracking location and the nut compartment so that shell fragments are directed away from the nut compartment and into the shell compartment. The nutcracking apparatus of the present invention is particularly usable by persons with impairment of hand motor skills.

10 Claims, 3 Drawing Sheets

NUTCRACKER WITH COMPARTMENTED RECEPTACLE

BACKGROUND OF THE INVENTION

The present invention concerns devices for cracking nuts. More particularly the invention is directed to such a device in combination with a receptacle for containing the nuts as well as the shells after the nuts have been cracked.

Nutcracking implements are certainly of very ancient origin. Over the years, various lever-actuated implements have been devised for cracking nuts. Two such devices are shown in Hahn, U.S. Pat. No. 4,641,430 and Truax, U.S. Pat. No. 4,843,715. These two patents, like many others, focus upon sophisticated lever and fulcrum mechanisms to reduce the amount of force required to crack a nut.

Other prior devices have provided means for preventing the shell fragments from shooting out of the nutcracking apparatus. For instance, the Adams, U.S. Pat. No. 4,009,651,shows a cracking lever mounted in a carrying tray in which the nut is almost completely enclosed within a cracking chamber. The cracking chamber is defined in part by the cracking lever and side walls extending downward from the lever. In the Straw, U.S. Pat. No. 4,044,663, a circular bowl includes a pedestal extending upward through the center of the bowl for supporting the nut. The cracking lever includes a circular shield mounted thereon for confining the flying fragments of the nutshell as the nut is cracked. In both the Straw and Adams patents, the nut shell fragments are directed back into a tray surrounding the nutcracking chamber or pedestal.

The Davis U.S. Pat. No. 4,128,938, also includes a shield which is slide mounted onto the cracking lever. In the Davis patent, two separate containers are provided—one for storing nuts and one for receiving the shells from the nuts after they are cracked. This second container is mounted on the edge of the nut container with a pedestal or rod extending through the shell container for supporting the cracking lever.

The design Carlson U.S. Pat. Des. 158,932, shows a combined bowl and nutcracker. However, the Carlson apparatus includes no means for separating uncracked nuts and the shells of cracked and eaten nuts.

In spite of the plethora of nutcracker designs, there remains a need for a nutcracker which is readily and easily used by people with certain handicaps that restrict their ability to use their hands and arms. It has been found that people with impaired hand motor skills have difficulty using the nutcracking devices of the prior art, including those devices in which the cracking lever arm is mounted on a cracking base or in a container, such as in the several patents discussed above. It is often particularly difficult for persons with impaired hand functions to remove the shell fragments from the nutcracking station, particularly where shields are provided for restricting and containing flying shell fragments.

There is therefore a need for a nutcracking apparatus which is readily usable by persons with impaired hand motor skills. Moreover, there is a need for such an apparatus that provides contiguous containers for both the nuts and the shell fragments after the nut is cracked. This nutcracking apparatus also requires some means for containing shell fragments as the nut is being cracked so that handicapped persons can easily collect the fragments for later disposal.

SUMMARY OF THE INVENTION

With these needs in mind and given the restrictions of the prior devices, the present invention contemplates a nutcracking apparatus having a compartmented receptacle. More particularly, the nutcracking apparatus of the present invention includes a receptacle having a central support wall which divides the receptacle into a nut compartment and a smaller shell fragment compartment. The support wall supports a platform upon which a cracking pad is mounted as well as a cracking lever arm mounted thereon. The support platform is wide enough to provide an adequate surface for absorbing the force of cracking relatively large nuts. Moreover, the platform is configured to provide a region underneath the platform for storing nuts in a nut compartment, thereby increasing the quantity of nuts that can be stored for eventual cracking.

A recess is provided in the cracking pad for locating a nut therein. The cracking lever arm also includes a notch aligned with the recess in the cracking pad for firmly restraining the nut during the cracking process.

The support platform also includes retainer walls mounted thereon. In particular, an end retainer wall and a side retainer wall are provided. The side retainer wall is situated on the side of the platform adjacent the shell compartment of the receptacle. A shell directing wall is provided opposite the side retainer wall and adjacent the nut compartment. The shell directing wall is longer than the side retainer wall to provide means for directing the shell fragments away from the nut compartment and into the shell compartment after the nut has been cracked.

One object of this invention is to provide a nutcracking apparatus which includes a compartmented receptacle for storing both the nuts and the shell fragments after the nuts have been cracked. Another object is to provide such a nutcracking apparatus that can be easily used by persons with impaired hand motor skills.

A further object of this invention is to provide a nutcracking apparatus with adequate containment for the nut shell fragments as the nut is cracked. A further object and a particular benefit of the present invention is the provision of a nutcracker and compartmented receptacle combination that can be readily fabricated without many sophisticated moving parts.

Other objects and benefits of the present invention will become obvious from consideration of the following written description and accompanying figures.

DESCRIPTION OF THE PREFERRED EMBODIMENT

Figure 1:
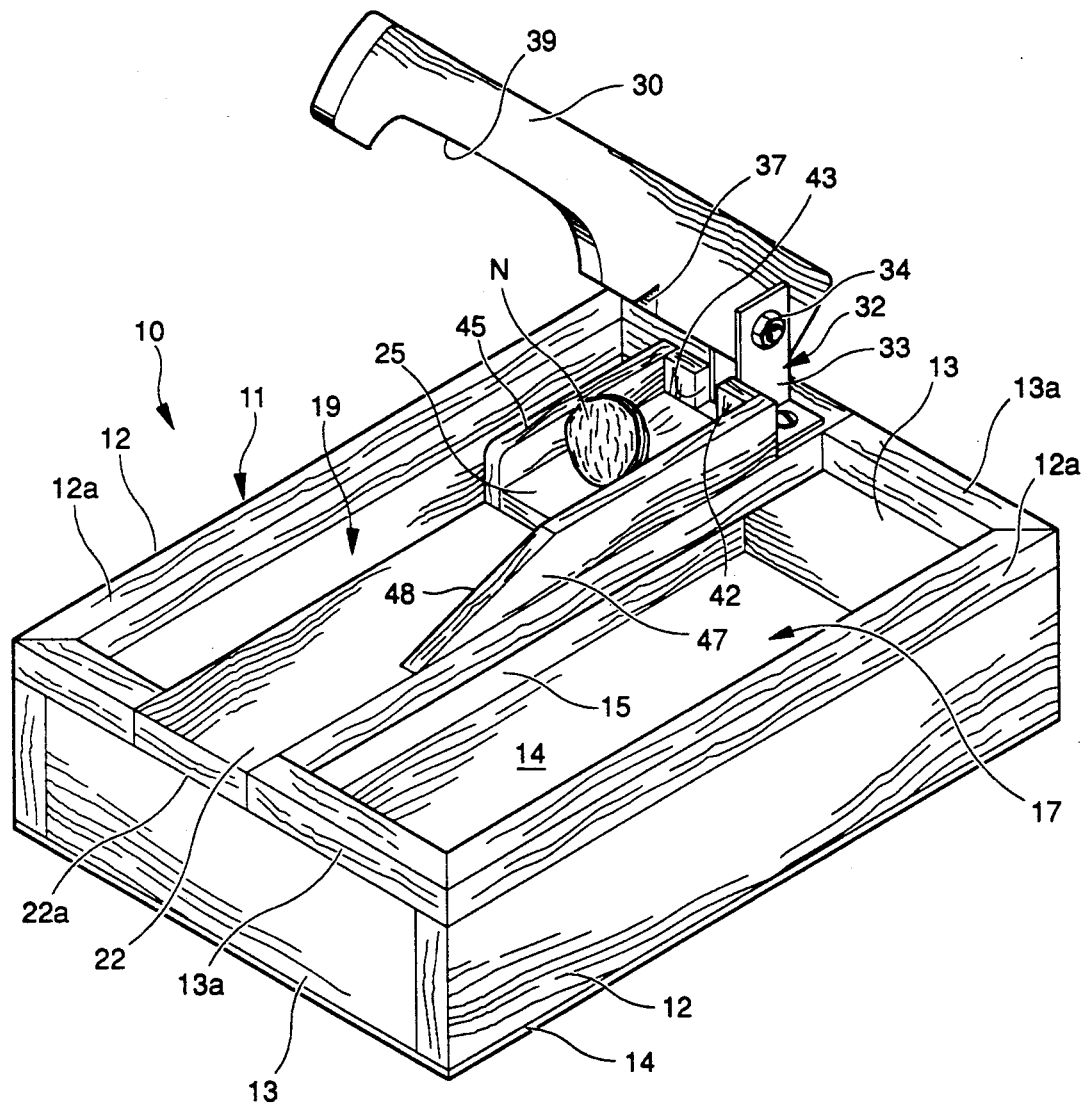
FIG. 1 is a left isometric projection of the nutcracking apparatus of the present invention having a compartmented receptacle, shown with the cracking lever arm raised and with a nut in position to be cracked.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A nutcracking apparatus 10 of one embodiment of the present invention includes a generally rectangular receptacle 11 having opposite side walls 12 and opposite end walls 13. A floor 14 is affixed to the side walls and end walls 13 to form a box or compartment. In one important aspect of the present invention, a support wall 15 extends between and parallel to the side walls 12. The support wall 15 extends along the entire length of the receptacle 11 and is joined to the end walls 13.

The support wall 15 divides the receptacle 11 into a nut compartment 17 and a shell compartment 19. As is seen more clearly in FIG. 3, the nut compartment 17 is significantly larger than the shell compartment 19 of the receptacle 11. The uncracked nuts are stored in the nut compartment 17 prior to being cracked. As should be apparent, the shell compartment 19 is used to contain the shell fragments after a nut has been cracked. Naturally, after the nut has been cracked and its fruit removed, the shell fragments occupy considerably less space than the complete uncracked nut. Hence, the shell compartment 19 can be much smaller than the nut compartment 17.

Figure 3:
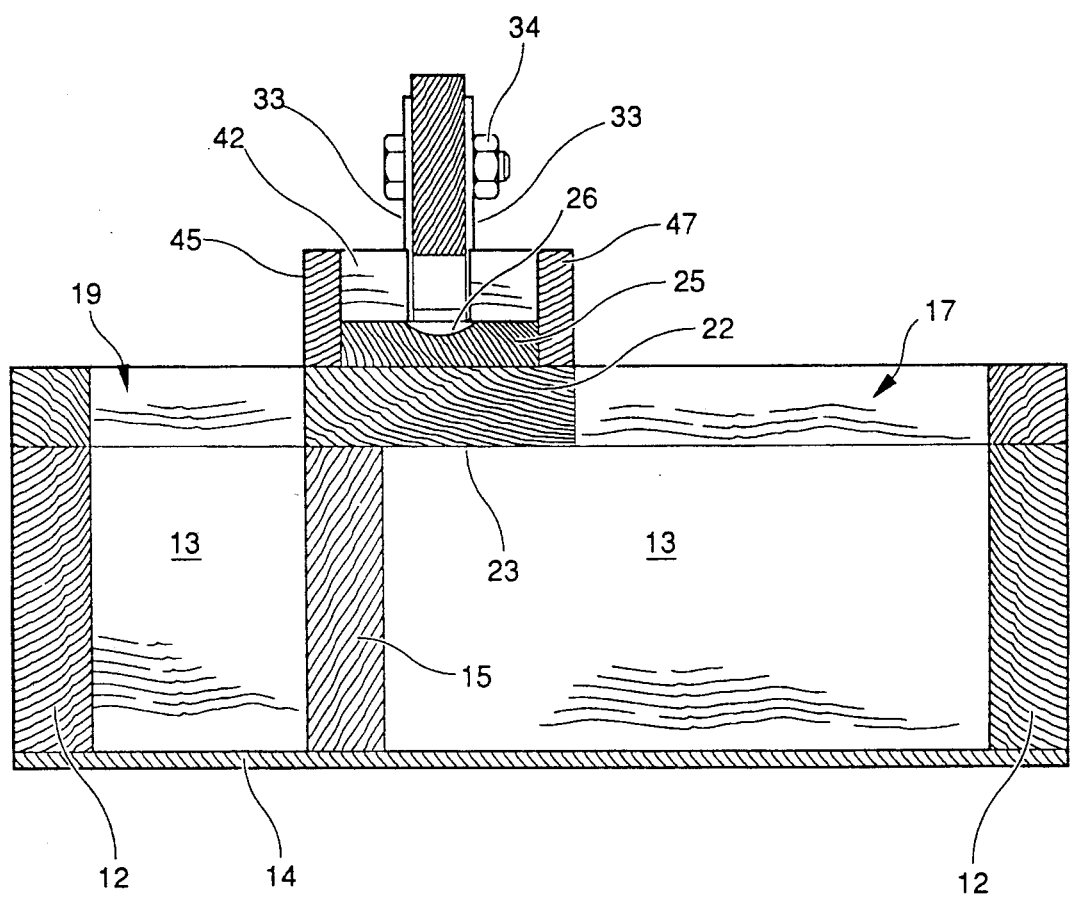
FIG. 3 is a lateral cross-sectional view of the nutcracking implement of FIG. 1 and 2, taken along line 3—3 in FIG. 2, with the nut removed to show specific features of the cracking pad and cracking lever arm.

In one specific embodiment, the side walls 12 and end walls 13 of the receptacle 11 enclose a volume that is 8 inches wide by 12½ inches long by 3¼ inches high. The support wall 15 is displaced from the midline of the receptacle 11, as shown in FIG. 3, such that the nut compartment has a width of about 2 inches while the shell compartment has a width of about 5½ inches. In this specific embodiment, the shell compartment 17 can hold about 2½ pounds of average size nuts.

Mounted on the support wall 15 is a support platform 22. The ends 22a of the platform are also supported by the end walls 13. Strips 12a and 13a are also affixed to the side walls 12 and end walls 13, respectively, to form a uniform upper edge to the receptacle 11 with the ends 22a of the platform 22. The support platform 22 must have enough width to provide adequate support surface to absorb the force exerted in cracking the nut N situated thereon. Thus, in order to provide an adequate cracking surface without unnecessarily impinging on the storage volume of the nut compartment 17, the support platform 22 has been configured to form an overhang portion 23, as shown in FIG. 3. The cracking force is distributed through the support platform 22 to the support wall 15 and end walls 13.

The support platform 22 has a width, in one specific embodiment, of about 2½ inches. In the specific embodiment, the support platform 22 is glued to the support wall 15 and end walls 13, although other means of fixing this components are contemplated by the present invention.

The support platform 22 provides a foundation for cracking the nut N. More particular, a cracking pad 25 is mounted on the support platform 22, and is provided with a recess 26 (see FIG.3) for receiving the nut N therein.

The nutcracking apparatus 10 further includes a cracking lever arm 30. The lever arm 30 is pivotably mounted to the support platform 22 by way of a pivot mount assembly 32. The pivot mount assembly includes a pair of side brackets 33 with a pivot bolt assembly 34 extending therebetween and through a bore in the cracking lever arm 30. The side brackets 33 are preferably engaged to the support platform 22 by a pair of wood screws.

Figure 2:
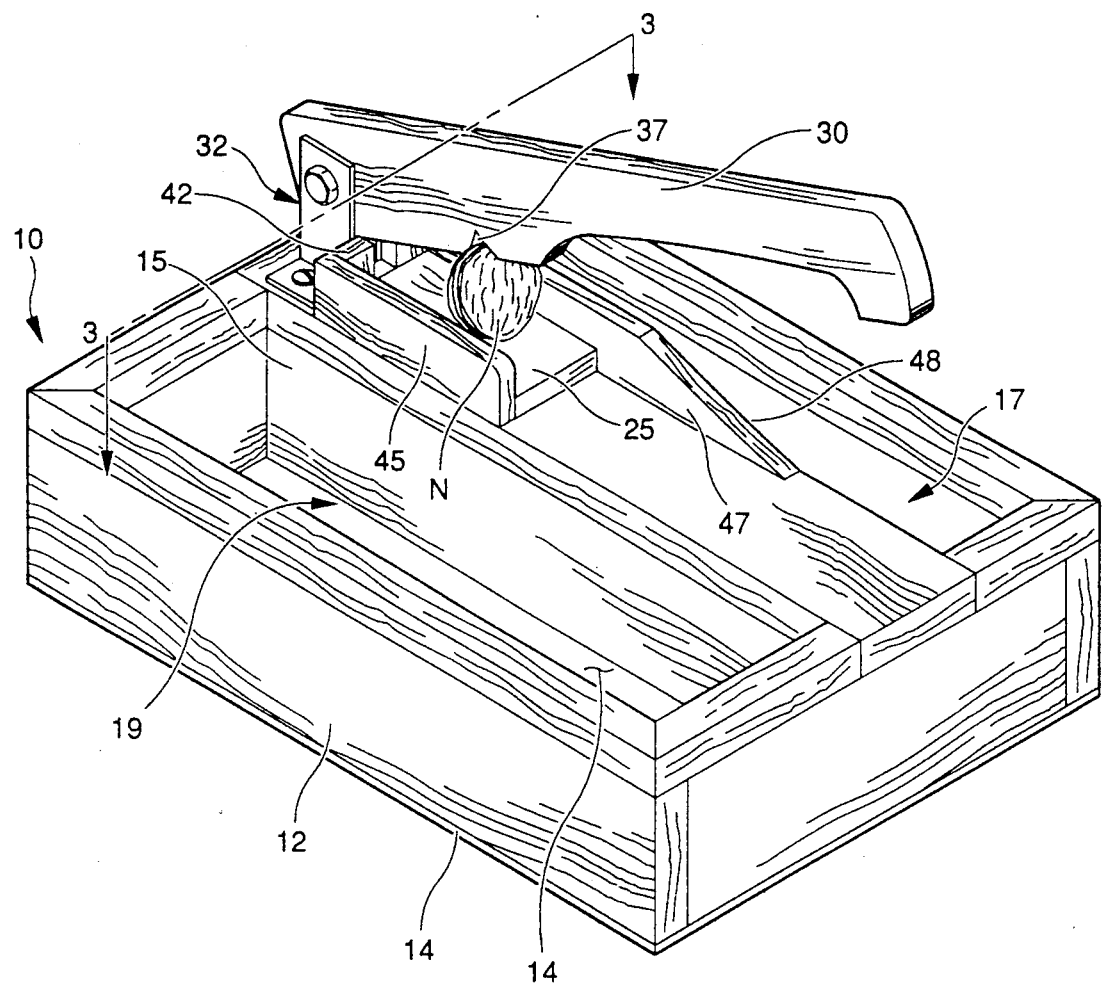
FIG. 2 is a right isometric projection of the nutcracking apparatus shown in FIG. 1, in which the cracking lever arm is depicted lowered onto the nut just prior to applying force on the lever arm to crack the nut.

The cracking lever arm 30 includes a notch 37 situated directly above the recess 26 in the cracking pad 25 when the lever arm contacts the nut N to be cracked, as is shown in FIG. 2. A cut-out 39 is provided as a hand grip. As can be seen from the figures, the cut-out 39 is enlarged, as is the cracking lever arm 30 itself, to provide a good grip for persons with limited use of their hands. In addition, the cracking lever arm 30 has a fairly substantial width, in the specific embodiment ⅛ to ¼ inches, to again provide a good gripping surface for those with limited hand motor skills. In one specific embodiment, the lever arm 30 is about 14 inches long from the pivot point to the end of the handle, thereby providing a very good lever arm for cracking the nut.

The nutcracking apparatus 10 of the present invention also includes means for containing the shell fragments once the nut has been cracked and for directing the fragments into the nut compartments 17. In particular, this means includes an end retainer wall 42 at the end of the cracking pad 25 adjacent the pivot mount assembly 32 for the lever arm 30. The end retainer wall 42 includes a slot 43 to allow the lever arm to be pivoted downward toward the cracking pad 25. In this manner, the lever arm itself acts as means to contain the nut shell fragments in conjunction with the end retainer wall 42.

The fragment containment means includes a side retainer wall 45 which is adjacent the shell compartment 19 of the receptacle 11. On the opposite side of the cracking pad 25 is a second side retainer wall, or more specifically a shell-directing wall 47. As seen in FIGS. 1 and 2, this shell-directing wall 47 is longer than the side retainer wall 45, extending in one specific embodiment about four inches beyond the end of the cracking pad 25. The extended length of the shell-directing wall 47 prevents the shell fragments from falling into the nut compartment 17, rather than into the shell compartment 19 where they belong. In addition, the shell-directing wall 47 assists people with limited hand movement to sweep the shell fragments away from the cracking pad 25 into the nut compartment 17.

The shell-directing wall 47 includes an angled edge 48 extending from the end of the wall to provide hand clearance as the cracking lever arm 30 is forced downward toward the support platform 22 when cracking a nut N. In addition, the shell-directing wall 47 terminates well short of the end of the support platform 22 to again provide adequate clearance for the operator's hand when cracking a nut.

The nutcracking apparatus of one specific embodiment is formed of wood, and particularly #2 pine furring strips. The nutcracker and compartmented receptacle of the present invention lends itself very well to fabrication from wood strips. Each of the wooden components can be glued together or engaged by some other fastener such as a wood screw. Since the compartments of the receptacle itself do not bear much load, it is believed that the side walls 12, end walls 13 and floor 14 can be glued together. The support wall 15 and support platform 22 are the primary load-bearing components of this invention. While it is believed that these compartments can also be glued to the remainder of the nutcracking apparatus 10, it may be prudent to fasten these components by wood screws. The cracking pad 25, end retainer wall 42, side retainer wall 45 and shell-directing wall 47 can also be glued to the support platform 22. As previously discussed, the pivot mount assembly 32 is fastened by screws to the support platform 22.

Alternatively, the nutcracking apparatus 10 of the present invention can be molded from plastic or other suitable material. It is understood, however, that this molded material must be sufficiently rigid to permit cracking of a relatively hard nut N, without deforming the cracking lever arm 30, cracking pad 25, support platform 22 or support wall 15. Thus, a fairly hard plastic must be used, at least for these critical components for the cracking mechanism.

In addition, while the nutcracker of one specific embodiment has been described as having particular dimensions, other nutcrackers and compartmented receptacle combinations are contemplated having smaller or larger dimensions. However, it should be kept in mind that since one benefit of the design of the present nutcracking apparatus 10 is its ability to be readily used by those with hand impairments, the dimensions preferably should not be reduced to a point that it is unusable by persons with this handicap.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A nutcracking apparatus comprising:
   a receptacle having a pair of opposite receptacle side walls, a pair of opposite receptacle end walls and a floor to define a receptacle compartment;
   a support wall mounted within said compartment and across said receptacle for dividing said receptacle compartment into a first compartment and a smaller second compartment, whereby said first compartment is adapted for receiving a quantity of uncracked nuts therein;
   a support platform mounted on said support wall, said support platform including means for supporting a nut to be cracked; and
   a cracking lever arm having means for pivotably mounting said lever arm to said receptacle, said cracking lever arm oriented to engage and crack a nut situated between said cracking lever arm and said support platform.

2. The nutcracking apparatus of claim 1, further comprising fragment containment means mounted on said support wall for retaining fragments from a nut cracked between said cracking lever arm and said support platform.

3. The nutcracking apparatus of claim 2, wherein said fragment containment means includes an end wall adjacent said means for pivotably mounting said cracking lever arm, said end containment wall having a slot defined therein to receive said lever arm therein when said lever arm is used to crack a nut.

4. The nutcracking apparatus of claim 2 wherein said fragment containment means includes a pair of opposite side containment walls, each adjacent a respective one of said first compartment and second compartment for preventing fragments from falling into said compartments when a nut is cracked between said cracking lever arm and said support platform.

5. The nutcracking apparatus of claim 4, wherein one of said pair of opposite side containment walls adjacent said first compartment is a shell directing wall having a length substantially longer than the length of the other of said pair of opposite side containment walls, whereby fragments from a cracked nut are readily directed toward said second compartment and away from said first compartment.

6. The nutcracking apparatus of claim 5, wherein said shell-directing wall includes an angled edge adjacent one end of said wall distal said means for supporting a nut to be cracked, thereby providing clearance for the operator's hand when gripping the cracking lever arm.

7. The nutcracking apparatus of claim 1 wherein said support platform includes an overhang portion extending into said nut compartment.

8. The nutcracking apparatus of claim 1, wherein said support platform is mounted to at its opposite ends to said receptacle end walls.

9. The nutcracking apparatus of claim 1, wherein said means for supporting a nut to be cracked includes a cracking pad mounted on said support platform, said cracking pad having a recess defined therein configured to support a nut to be cracked.

10. The nutcracking apparatus of claim 9 wherein said cracking lever arm includes a notch defined in said arm and situated to engage a nut when the nut is within said recess and said cracking lever arm is lowered into contact with the nut.

* * * * *